Feb. 28, 1928.
A. KÉGRESSE
1,660,383
TENSIONING MECHANISM FOR ENDLESS TRACK BELTS
Original Filed Aug. 22, 1922
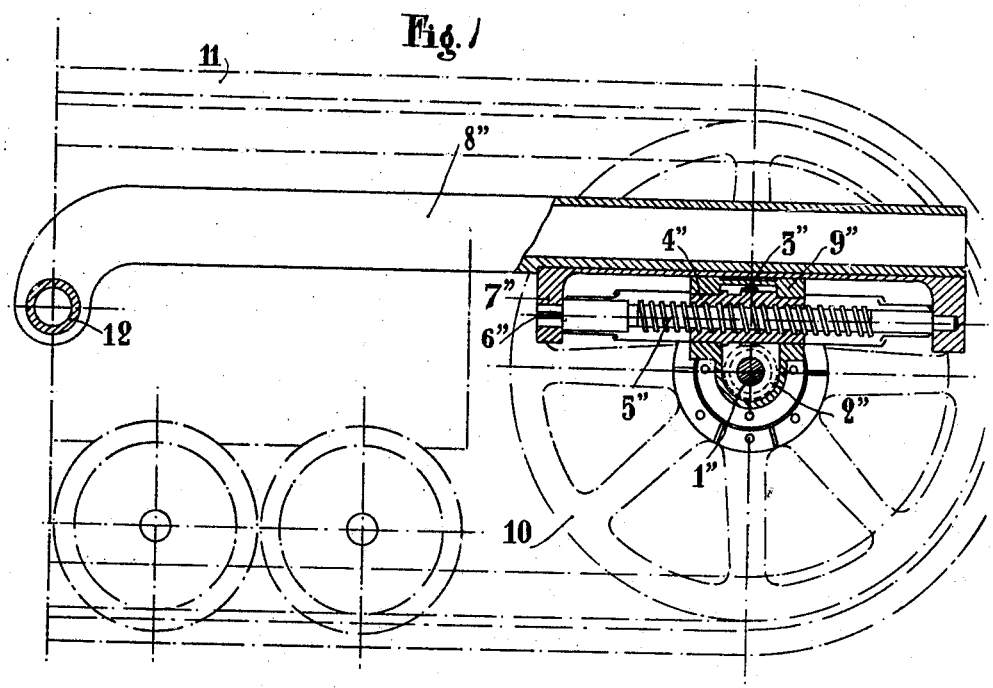
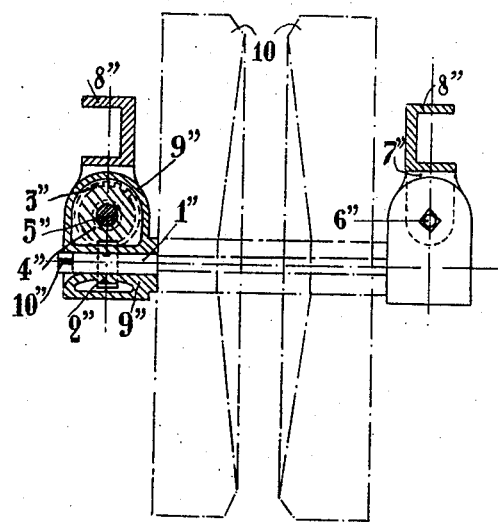
INVENTOR:
Adolphe Kégresse
BY
ATTORNEY Patented Feb. 28, 1928.

1,660,383

UNITED STATES PATENT OFFICE.

ADOLPHE KÉGRESSE, OF PARIS, FRANCE.

TENSIONING MECHANISM FOR ENDLESS-TRACK BELTS.

Original application filed August 22, 1922, Serial No. 583,609, and in France August 23, 1921. Divided and this application filed March 19, 1924. Serial No. 700,330.

This invention relates to systems for stretching or tensioning endless track belts, and is a division of my prior application, No. 583,609, filed August 22, 1922, which application, in turn, involves certain improvements on the construction disclosed in a still earlier application, No. 494,473, filed August 23, 1921.

The invention involves the use of a swinging member or members pivotally connected either with the central balance beam of the vehicle or with the vehicle axle and also connected with one of the rollers or pulleys around which the track belt passes, so that said roller or pulley will thus be enabled to swing upward or downward automatically in an arc of a circle during the travel of the vehicle over irregularities in the road.

More particularly, however the invention resides in the provision of means whereby the above-mentioned belt roller or pulley may be shifted bodily backward or forward relatively to the pivotally-mounted connecting means previously referred to, so as to stretch or loosen the belt as circumstances may require; this adjustment being effected manually, as opposed to the automatic swinging movement of the aforesaid connecting means.

An embodiment of the invention is illustrated in the accompanying drawings, in which:

Figures 1 and 2 are respectively, a side elevation and an end view, both partly in section, of a system constructed to effect the bodily shifting of the belt roller or pulley.

Referring in detail to said drawings, the construction therein illustrated is characterized by the fact that the improved stretching mechanism is operated by the axle 1" on which is mounted the belt pulley or roller 10 over which the endless track belt 11 passes. For this purpose there is fixed on each end of said axle a spiral pinion 2" which meshes with and drives a second spiral pinion or gear 3" formed integral with or otherwise rigidly secured to a traveling nut 4", the latter fitting on a horizontal screw-threaded rod 5". Each rod 5" is mounted at its ends in a depending yoke 7", secured to the under side of the adjacent stretcher arm 8" which is pivoted at one end to the vehicle axle 12 and extends at its other end across the axle 1", as shown in Fig. 1; said rod terminating at one end in a squared portion 6" to prevent it from rotating. The axle 1", together with the nuts 4" and their gears 3", rotates freely in a suitable casing 9" upon which the yokes 7" carried by arms 8" rest, and across which they are adapted to slide.

The roller or pulley axle 1" is provided with a square terminal 10" which may be engaged by a suitable socket wrench to permit the axle to be turned, such movement rotating the two pinions 2" and, hence, the gears 3" and nuts 4". The latter rotate on the screws 5" which are themselves held against turning by their squared ends 6", so that said nuts are therefore compelled to move endwise toward one end or the other of the screws according to the direction in which axle 1" is rotated, with the result that the said axle and the pulley 10 are shifted bodily in the direction desired. The arms 8", as will be understood, are free to swing up and down, due to their pivotal mounting, this swinging movement being effected automatically consequent upon the passage of the vehicle over irregularities in the road, and being independent of the manual adjustment and bodily shifting of the belt pulley or roller 10 effected by rotating axle 1" as above described.

I claim as my invention:

1. Tensioning mechanism, comprising a belt roller, an axle whereon the same is mounted, said axle adapted to be manually rotated, a pair of supports each mounted at one end and having its other end slidably related to said axle, and a connecting system between each end of the axle and the adjacent support for shifting the axle and the roller thereon bodily as a unit either forward or backward relatively to said supports when said axle is rotated; each connecting system comprising a fixed screw carried by the respective support, a nut mounted to travel thereon, and intermeshing gears fixed to the nut and roller axle.

2. Tensioning mechanism, comprising a belt roller, an axle whereon the same is mounted, said axle adapted to be manually rotated, a pair of supports each mounted at one end and having its other end slidably related to said axle, and a connecting system between each end of the axle and the adjacent support for shifting the axle and the roller thereon bodily as a unit either forward or backward relatively to said supports when said axle is rotated; each connecting system comprising a fixed screw carried by the respective support, a nut mounted to travel thereon, a spiral gear encircling said nut and rigidly connected thereto, and a spiral driving gear fixed to the roller axle and meshing with the first gear.

In testimony whereof I affix my signature.

ADOLPHE KÉGRESSE.